United States Patent Office 3,759,864
Patented Sept. 18, 1973

3,759,864
COATING COMPOSITIONS
Peter Francis Nicks, Maidenhead, England, assignor to Imperial Chemical Industries Limited, London, England
No Drawing. Filed Oct. 15, 1971, Ser. No. 189,789
Int. Cl. C08g 51/04, 51/28
U.S. Cl. 260—33.6 EP        11 Claims

ABSTRACT OF THE DISCLOSURE

Pigmented solid particles of film-forming polymer, suitable for use in powder coating compositions, are prepared by volatilising the volatile liquid continuous phase of a pigmented dispersion of film-forming polymer. The polymer is dispersed by emulsification in volatile liquid in the presence of a defined polymeric agent. Volatilisation is preferably effected by spray drying.

This invention relates to a process of preparing pigmented solid particles of film-forming polymer and to coating compositions which comprise such particles.

FIELD OF THE INVENTION

In recent years there has been considerable interest in the coating of articles with compositions known as "powder coatings." This has been partly due to the fact that powder coatings (referred to herein as powder coating compositions), unlike conventional paints, are free from volatile diluents which may be expensive and may present a fire and/or a pollution hazard. These compositions normally comprise essentially solid particles of a mixture of film-forming polymer and pigment together with any other necessary additive such as catalyst or flow promoting agent. The compositions may be applied to an article by a fluidised bed technique in which the article is preheated and immersed in a dense cloud of the particulate film-forming polymer, the particulate polymer behaving as a fluid and adhering to the surface of the hot article where it is at least partially fused. The coating may then be completely fused or cured by a further heat treatment. Alternative methods of application include electrostatic spray, flame spray, or electrostatic fluidised bed.

DESCRIPTION OF THE PRIOR ART

The present methods of producing powder coating compositions are more akin to the established techniques of the plastics industry than to those of the paint industry. The coatings are commonly produced by premixing film-forming polymer with pigment and any necessary additives, extruding this mixture to melt the polymer and disperse the pigment, and subsequently cooling and pulthe total composition, to produce a uniform colouration this process is the difficulty of incorporating the necessary proportion of pigment, usually only a small part of the total composition, to produce a uniform colouration and to match a desired shade, since the pigment can only be incorporated satisfactorily at the premixing stage.

Another disadvantage is that only a limited range of film-forming polymers can be pulverised satisfactorily at ambient temperatures. A further disadvantage is that, although it is preferred for fluidised bed application that the particles are substantially spherical and of a specified size or a mixture of sizes, the pulversing of an extrudate may produce particles which are irregular in shape and it is not easy to control their size.

SUMMARY OF THE INVENTION

We have now found that improved pigmented solid particles of film-forming polymer, suitable for use in powder coating compositions, can be produced by a process which comprises the steps: (a) emulsifying the film-forming polymer as a liquid disperse phase in a volatile liquid continuous phase which contains dissolved therein a polymeric emulsifying agent containing in its molecule at least one chain-like component of a type which is soluble in the film-forming polymer and at least one chain-like component of another type which is soluble in the volatile liquid continuous phase, the average molecular weight of the individual components being at least 1000, the total molecular weight of the individual components of each type being at least 3000 or at least $n \times 1000$ whichever is the greater where $n$ is the number of individual components soluble in the liquid continuous phase and the ratio of the total molecular weights of the individual components of the two types is from 3:1 to 1:3, (b) blending with the film-forming polymer a pigment which is preferably dispersed in a volatile liquid, the liquid being both miscible with the volatile liquid continuous phase of the emulsion described in (a) and a non-solvent for the film-forming polymer, the steps (a) and (b) being taken in either order, and then (c) volatilising the volatile liquid from a blend of dispersed polymer and pigment to produce pigmented solid particles of polymer.

One preferred process comprises the steps: (a) emulsifying the film-forming polymer as a liquid disperse phase in a volatile liquid continuous phase which contains dissolved therein a polymeric emulsifying agent containing in its molecule at least one chain-like component of a type which is soluble in the film-forming polymer and at least one chain-like component of another type which is soluble in the volatile liquid continuous phase, the average molecular weight of the individual components being at least 1000, the total molecular weight of the individual components being at least 3000 or at least $n \times 1000$ whichever is the greater where $n$ is the number of individual components soluble in the liquid continuous phase and the ratio of the total molecular weights of the individual components of the two types is from 3:1 to 1:3, (b) cooling the emulsion to solidify the film-forming polymer and blending therewith a pigment dispersed in a volatile liquid, the liquid being miscible with the liquid continuous phase of the emulsion and a non-solvent for the polymer and (c) volatilising the volatile liquid from a blend of dispersed polymer and pigment to produce pigmented solid particles of polymer.

DETAILED DESCRIPTION OF THE INVENTION

Preferably the pigment is blended with the film-forming polymer after the polymer has been emulsified in the volatile liquid continuous phase since if polymer is emulsified together with pigment in the continuous phase there is competition between the two species for the dissolved emulsifying agent and this may result in flocculation of pigment, or a too-fine particle size polymer dispersion.

Preferably the pigment is first dispersed in a suitable volatile liquid continuous phase and preferably in the presence of a dispersant which is soluble in the continuous phase of the emulsion of film-forming polymer. A further preference is that the dispersant is a polymeric emulsifying agent which has substantially the same constitution as or is the same chemical type as that used to emulsify the film-forming polymer.

It is one advantage of this process that pigmented solid particles of film-forming polymer of controlled size can be produced without resort to the pulverising which is necessary with bulk polymer in prior processes. Moreover, certain polymers are not amenable to pulverising. In an advantageous modification of the process pigmented solid particles may be produced to any desired shade of colour by making any necessary supplementary addition of pigment (preferably dispersed in volatile liquid) to an already pigmented dispersion of polymer until the desired shade is obtained. This is an established technique of the paint industry and is in contrast to the more difficult sampling of a dry premixture of polymer and pigment.

The type of polymeric emulsifying agent and the method of emulsification to be employed in the present process has been broadly described in the specification of our British patent specification 1,211,532 which relates to the preparation of dispersions of liquid particles in a liquid continuous phase. The criteria for selecting an emulsifying agent appropriate to a given film-forming polymer which is to be emulsified in a given continuous phase are substantially as described in the specification. It follows that at the prevailing pressure since the film-forming polymer must be liquid when emulsification takes place, the polymer must be liquid at a temperature which is lower than the boiling point of the continuous phase of the emulsion. At the same time, although the continuous phase must not volatilise to any substantial extent at the emulsification stage when the film-forming polymer is in the liquid state, it must be sufficiently volatile that ultimately it can be readily volatilised by a suitable process when the polymer is substantially in the solid state. Preferably the boiling point of the continuous phase of the emulsion is at least 10° C. higher but not more than 50° C. higher than the temperature at which the film-forming polymer liquefies.

Film-forming polymers which may be employed in the present process include epoxy resins, polyester resins, melamine formaldehyde pre-condensates, epoxy resin/phenol formaldehyde pre-condensates, polyester/melamine formaldehyde blends, certain acrylic polymers, and condensation polymers such as certain polyamides. Crosslinkable polymers or crosslinking agents active above the emulsification temperature may also be employed. Particularly suitable polymers are the epoxy resins, made by condensing epichlorhydrin with diphenylolpropane.

In general, for use in powder coating compositions, the particularly suitable polymers will liquefy in the range 80–150° C. Mixtures of polymers may be used including, for example, mixtures of polymer in which one polymer contains groups crosslinkable with groups in another polymer. In the emulsification stage of the present process it may be desirable to prepare an emulsion in which different polymers are present as separate disperse particles, for example by separately emulsifying the polymers in a common continuous phase or by mixing two or more emulsions of different polymer preformed in continuous phases of the same or similar composition.

The broad requirements of the liquid forming the continuous phase of the emulsion are that it should have a boiling point higher than the liquefying temperature of the polymer disperse phase; that it should be a non-solvent for the film-forming polymer; and that it should form a distinct liquid phase under all conditions and in all proportions that it is used with the polymer. The selection of a liquid appropriate to a given film-forming polymer will be readily carried out, therefore, by those skilled in the art bearing in mind that the liquid must be completely and readily removed in the final stage of the process. Suitable liquids may cover the whole spectrum of polarity, that is they may range from the non-polar aliphatic and aromatic hydrocarbons through long aliphatic hydrocarbon chain esters and ketones, ethers and alcohols to the highly polar lower alkanols and water. Mixtures of miscible liquids may be employed. Preferably the liquid continuous phase is of non-polar liquid rather than a polar liquid since non-polar liquids are more readily volatilised from the dispersion of film-forming polymer. Particularly suitable liquids include, therefore, the aliphatic and aromatic hydrocarbons but the invention is also applicable to polar liquids such as water).

The solid pigmented particles (secondary particles) suitable for use in powder coating compositions, which are produced in the present process will normally comprise an aggregation of substantially spherical smaller particles (primary particles) which are those disperse particles formed at the emulsification stage of the process. The nature of the secondary particles is determined principally by the method of volatilising volatile liquid from the blend of dispersed polymer and pigment.

In general the temperature at which volatilisation is effected should not be so high that the primary particles coalesce.

It is preferred that the solid pigmented particles are produced by spray drying the pigmented dispersion of film-forming polymer in volatile liquid since the particles are then substantially spherical and good control of particle size is possible.

Alternatively, the volatilisation may be effected from the bulk pigmented dispersion to leave a mass of primary particles which is readily crushed to produce secondary particles of desired size. In each case there is avoided the grinding or pulverising of bulk polymer of the prior methods.

The character of the primary particles is determined essentially by the nature of the emulsifying agent and by the proportion of agent which is used in the emulsification. In the present process we may employ from 0.1 to 10% by weight of polymeric emulsifying agent based on the weight of the disperse phase. Depending upon the proportion of emulsifying agent used, the nature of the agent, the film-forming polymer and the continuous phase, the corresponding average diameter of primary particles will usually be in the range 20–0.05 microns. Preferably, we employ from 0.1 to 2.5% by weight of emulsifying agent when the average primary particle diameter will usually be in the range 10–0.1 microns.

Secondary particles comprising an aggregation of primary particles may be produced by the volatilisation methods described above having average diameter in the range 10–90 microns for electrostatic spray application and in the range 100–300 microns for fluidised bed application.

Preferably the average molecular weight of the individual components of the emulsifying agent is at least 1500 and the total molecular weight of each type of component is at least 4,500. The solubility of the components in their respective liquid should be such that the component and liquid are miscible in all proportions.

The general types of component which may be present in an emulsifying agent suitable in the emulsification stage of the present process and the methods of preparation of the agent are broadly disclosed in British Pat. No. 1,211,532. Since it is preferred that the liquid continuous phase is aliphatic or aromatic hydrocarbon, for example, commercially available white spirit, or kerosene, particularly suitable agents are those which contain as chain-like components soluble in the liquid continuous phase:

polymers of long chain esters of unsaturated acids, e.g. stearyl, lauryl, octyl, 2-ethyl hexyl, hexyl and butyl esters of acrylic and methacrylic acids;

polymers of vinyl esters of long chain acids, e.g. vinyl stearate and vinyl esters of versatic acid;

polymeric vinyl alkyl ethers of higher alkylene oxides, e.g. polypropylene oxide of molecular weight 1,000–3,000;

polymers of butadiene and isoprene and non-crystalline polymers of ethylene and propylene;

self-polyesters (of molecular weight greater than 1,000) of hydroxy fatty acids, e.g. 12-OH stearic acid, hydrogenated castor oil fatty acids and the hydroxy acids of carnauba wax;

polyesters of di-acids with diols, e.g. polyesters of sebacic acid with 1,12-dodecane diol or of adipic acid with neo-pentyl glycol.

When the disperse film-forming polymer phase is, for example, an epoxy resin the chain-like component soluble therein may be, for example, a copolymer of methyl methacrylate containing up to 10% by weight of methacrylic acid, or alternatively an epoxy resin of molecular weight higher than 1000.

Particularly suitable emulsifying agents in the present process are those comprising a polymeric backbone providing one type of component and carrying as one or more sides chains, components of the other type. The preparation of agents of this type is described in British Pat. 1,122,397. Alternatively both types of chain-like components may be pendant from the same polymer backbone.

The emulsification of polymer in a liquid continuous phase containing dissolved emulsifying agent may be performed by conventional techniques, for example by vigorously stirring liquid polymer and liquid continuous phase.

Preferably the emulsion is then cooled to produce a dispersion of solid polymer particles prior to blending with dispersed pigment. The disperse polymer particles are preferably but not essentially solidified before pigmentation since in the liquid state it may be difficult to control the distribution of surfactant, (i.e. including emulsification agent and any other added surfactant) between polymer and pigment, and changes in the particle size of the disperse polymer may occur during pigmentation. Before pigmentation and preferably whilst the disperse polymer particles are still liquid, other materials may be added to the emulsion, for example any necessary catalyst or flow control agent, or the emulsion may be combined with another emulsion containing disperse polymer particles of different size and/or chemical constitution. Typical catalysts include those used in conjunction with epoxy resins, for example dicyandiamide and methyl succinic anhydride.

The pigment is preferably dispersed in a liquid continuous phase which has substantially the same chemical composition as the continuous phase of the dispersion of film-forming polymer with which it is to be blended although different liquids may be used. If, for example, the polymer is dispersed in aliphatic hydrocarbon then preferably the pigment is also dispersed in aliphatic hydrocarbon, even if of different boiling point, and optionally containing minor amounts of other liquids, e.g. aromatic hydrocarbon.

Preferably the pigment is dispersed in the presence of a polymeric emulsifying agent of the type described herein which is soluble in the continuous phase of the polymer emulsion as discussed earlier. Conventional dispersants may be used however and suitable polymeric dispersants in the case of a continuous phase which is aliphatic hydrocarbon include simple alkyd resins and dispersants of the type described in British patent specification 1,108,261.

Typical pigments which may be used in the present process include carbon blacks, titanium dioxide, iron oxides, chromes, phthalocyanine blues and greens and other organic pigments, and metallic pigments such as aluminum. In the term "pigment" we include extenders and fillers such as barytes, china clay, talc and silica.

As indicated above, the volatilisation of volatile liquid from the dispersion comprising polymer and pigment is preferably effected by spray drying since there is then produced a free-flowing powder consisting of substantially spherical particulate aggregates of primary polymer and pigment particles. A suitable spray drying equipment will consist of a spraying device, a chamber through which heated gas is passed and means for collecting the dry particles. The gas may be, for example, air or nitrogen. The spraying device may be a centrifugal, pressure or thin fluid atomiser which should be adjusted to produce powder particles of average diameter in the range 10–300 microns.

The invention is illustrated by the following examples in which parts and percentages are by weight unless otherwise stated:

Example 1

A 99/1 copolymer (0.5 part) of methyl methacrylate and methacrylic acid of molecular weight about 30,000 and carrying on average about 20 side chains per molecule of poly(12-hydroxystearic acid) of average molecular weight about 1500 was dissolved in aliphatic hydrocarbon (100 parts) of boiling range 140–150° C. and the solution heated to 140° C. A commercially available epoxy resin (100 parts) having an epoxide equivalent of 1700–2000 and an approximate molecular weight ($M_n$) of 2900 was melted and added to the hot solution with vigorous agitation. A dispersion of epoxy resin was produced which was cooled to ambient temperature whilst stirring.

A pigment millbase (66 parts) consisted of 76.7% by weight of the total weight of millbase of Lemon Chrome dispersed in 23.3% by weight of the total of an aliphatic hydrocarbon (which already contained 3.4% by weight based on the hydrocarbon of the copolymer described above). The millbase was added to the cooled dispersion of epoxy resin with stirring. The resulting pigmented dispersion was poured into trays, dried in a current of warm air, and the product crushed to produce a powder.

When viewed under the optical microscope at a magnification of ×500, it was observed that the particle size of the dry powder was in the range 5–50 microns.

Example 2

A copolymer (5 parts) as described in Example 1 was dissolved in an aliphatic hydrocarbon (100 parts) of boiling range 140–150° C. and the solution heated to 140° C. A commercially available epoxy resin (100 parts) of the type described in Example 1 was melted and added to the hot solution with vigorous agitation. The resulting dispersion was allowed to cool to the ambient temperature and a Lemon Chrome millbase of the type described in Example 1 was added with stirring. The aliphatic hydrocarbon was removed from the pigmented dispersion under reduced pressure and the product crushed to produce a powder.

Examination of the dry powder under an electron microscope at ×10,000 magnification showed that the primary particle size was in the range 0.2–5 microns and that the pigment was evenly dispersed.

Example 3

A copolymer (0.5 part) as described in Example 1 was dissolved in an aliphatic hydrocarbon (100 parts) of boiling range 140–150° C. and the solution heated to 140° C. A pre-mixed blend (100 parts) of epoxy resin (90 parts) of epoxide equivalent weight of 1700–2000 with an epoxy resin (10 parts) of epoxide equivalent weight of 450–500 was melted and added to the hydrocarbon with vigorous agitation. The resulting dispersion was cooled to ambient temperature and a millbase (22.7 parts) added which consisted of 25.8% by weight based on the total millbase of a phthalocyanine blue pigment dispersed in 74.2% by weight based on the total of an aliphatic hydrocarbon (which already contained 3.4% by weight based on the hydrocarbon of the copolymer described in Example 1). The resultant dispersion was dried in trays in a current of warm air and the product crushed to a powder.

The dry powder thus obtained was found to have a particle size of 2–50 microns.

Example 4

An epoxy resin dispersion of the type described in Example 1 was prepared and cooled to ambient temperature. To the stirred dispersion (176 parts) were added a millbase (5.7 parts) containing 78.6% by weight of rutile titanium dioxide dispersion in 21.4% by weight of aliphatic hydrocarbon (containing 3.4% of the copolymer of Example 1) and a millbase (1.96 parts) containing 25.8% by weight of a phthalocyanine blue pigment as described in Example 3. The resulting dispersion was dried under reduced pressure and the product crushed to a powder. The particle size of the powder was 0.5–20 microns.

It was possible to tint the wet dispersion to a more intense blue shade before drying by the addition of further phthalocyanine blue millbase without (a) causing flocculation of the dispersion and (b) producing uneven colouring of the dried powder.

When a further sample of the pigmented dispersion was spray dried, a free-flowing powder was obtained which had a particle size of 20–60 microns.

Example 5

A dispersion of an epoxy resin was prepared as described in Example 1. To this disperison (200 parts) at ambient temperature was added (a) a millbase (66 parts) containing 76.7% by weight of Lemon Chrome as described in Example 1 and (b) a millbase (10 parts) containing 50% by weight dicyandiamide catalyst in aliphatic hydrocarbon.

After thorough stirring, the dispersion was dried under reduced pressure and the product crushed to a powder.

The resultant powder was applied to a degreased steel panel and heated at 150° C. for 30 minutes. A hard, tough coherent film was obtained which was evenly coloured over the whole of the panel surface.

The epoxy resin dispersions of Examples 1–4, when mixed with millbase and catalyst as described above, also yielded powder coating compositions which produced hard, coherent films on a steel substrate which were evenly coloured.

Example 6

A dispersion of a polyester resin (prepared by condensing 1.75 moles of neopentyl glycol, 0.25 moles of trimethylol propane and 2 moles of phthalic anhydride to an acid value of 25 mgm. KOH/gm.) of 50% solids content was prepared by the procedure of Example 1, but at 100° C. in aliphatic hydrocarbon (boiling range 140–180° C.) in the presence of 2% by weight of a graft copolymer prepared from poly(12-hydroxystearic acid)methacrylate/methyl methacrylate/hydroxyethyl methacrylate=50/40/10. The dispersion was cooled to ambient temperature and to 100 parts of the dispersion was added 5 parts of hexamethylol melamine and 4.8 parts of a millbase prepared from 47 parts of Monolite Fast Scarlet RNS and 53 parts of aliphatic hydrocarbon which already contained 10.4 parts of the above graft copolymer.

The pigmented dispersion was poured onto trays, dried and the product crushed. The primary particle size was 0.5–20 microns.

I claim:

1. A process of preparing pigmented solid particles of film-forming polymer which is liquid at a temperature in the range 80–150° C. and is solid at ambient temperatures, the process comprising the steps of: (a) emulsifying the film-forming polymer as a liquid disperse phase in a volatile liquid continuous phase having a boiling point from 10° C. to 50° C. higher than the temperature at which the film-forming polymer liquifies by heating the said polymer in the said liquid to a temperature at which the polymer is liquid in the presence, dissolved in the volatile liquid, of from 0.1 to 10% by weight based on the polymer disperse phase, of a polymeric emulsifying agent containing in its molecule at least one chain-like component of a type which is soluble in the film-forming polymer and at least one chain-like component of another type which is soluble in the volatile liquid continuous phase, the average molecular weight of the individual components being at least 1000, the total molecular weight of the individual components of each type being at least 3000 or at least $n \times 1000$ whichever is the greater where $n$ is the number of individual components soluble in the liquid containing phase and the ratio of the total molecular weights of the individual components of the two types is from 3:1 to 1:3, (b) cooling the emulsion to solidify the film-forming polymer and blending therewith a pigment dispersed in a volatile liquid, the liquid being miscible with the liquid continuous phase of the emulsion and a non-solvent for the polymer, and then (c) volatilizing the volatile liquid from a blend of dispersed polymer pigment to produce pigmented solid particles of polymer.

2. A process according to claim 1 wherein step (a) is carried out before step (b).

3. A process according to claim 1 wherein the pigment is dispersed in a volatile liquid in the presence of a polymeric emulsifying agent as defined in (a).

4. A process according to claim 3 wherein the polymeric emulsifying agent used to disperse the pigment and to prepare the emulsion of film-forming polymer have the same constitution.

5. A process according to claim 1 wherein the average molecular weight of the individual components of the polymeric emulsifying agent is at least 1500 and the total molecular weight of each type of component is at least 4500.

6. A process according to claim 1 wherein the polymeric emulsifying agent comprises a polymeric backbone providing one type of component and carrying as one or more side chains components of the other type.

7. A process according to claim 1 wherein the volatile liquid continuous phase comprises a non-aqueous liquid.

8. A process according to claim 7 wherein the volatile liquid continuous phase comprises an aliphatic or aromatic hydrocarbon.

9. A process according to claim 1 wherein the film-forming polymer is an epoxy resin.

10. A process according to claim 1 wherein at least one supplementary quantity of pigment, optionally dispersed in volatile liquid, is added to a pigmented emulsion of film-forming polymer to produce a desired shade of colour.

11. A process according to claim 1 wherein the volatilisation of volatile liquid is carried out by spray drying.

References Cited
UNITED STATES PATENTS

| | | | |
|---|---|---|---|
| 3,532,663 | 10/1970 | Nicks et al. | 260—34.2 |
| 3,449,291 | 6/1969 | Lerman et al. | 260—41 R |
| 3,674,736 | 7/1972 | Lerman et al. | 260—34.2 X |
| 3,561,003 | 2/1971 | Lanham et al. | 260—37 E P X |
| 3,679,612 | 7/1972 | Titow | 260—34.2 X |

LEWIS T. JACOBS, Primary Examiner

U.S. Cl. X.R.

260—32.8 R, 33.2 R, 33.4 R, 37 EP, N, 38, 39 R, 40 R